W. A. RANKIN.
ROASTING FURNACE.
APPLICATION FILED JAN. 12, 1906.

899,562.

Patented Sept. 29, 1908.

WITNESSES:
Daniel K. Allison
Geo E Kirk

W. A. Rankin INVENTOR
BY
G. F. DeWein ATTORNEY.

UNITED STATES PATENT OFFICE.

WILLIAM A. RANKIN, OF MILWAUKEE, WISCONSIN, ASSIGNOR TO ALLIS-CHALMERS COMPANY, OF MILWAUKEE, WISCONSIN, A CORPORATION OF NEW JERSEY.

ROASTING-FURNACE.

No. 899,562.　　　　Specification of Letters Patent.　　　Patented Sept. 29, 1908.

Application filed January 12, 1906. Serial No. 295,720.

*To all whom it may concern:*

Be it known that I, WILLIAM A. RANKIN, a citizen of the United States, residing at Milwaukee, in the county of Milwaukee and State of Wisconsin, have invented certain new and useful Improvements in Roasting-Furnaces, of which the following is a specification.

This invention relates to temperature control of a working member.

This invention has utility when applied to ore roasting furnaces. When used in the arms of such a furnace, efficient means is provided for economically preventing a weakening of the arm due to excessive heat.

Figure 1:
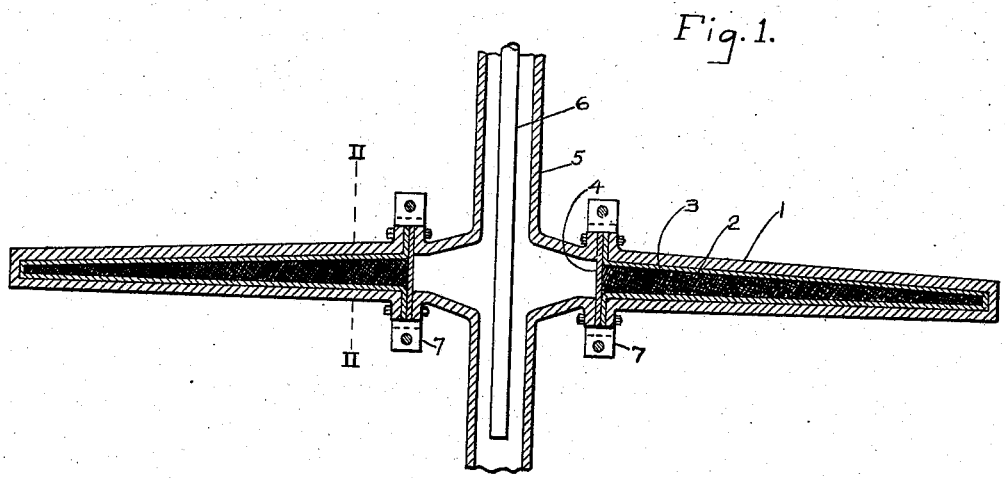
Figure 2:
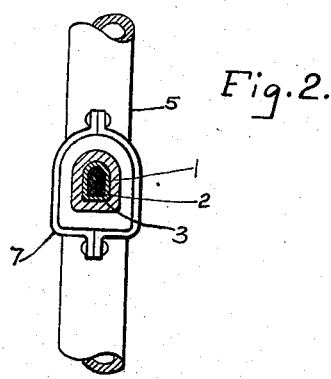

Referring to the drawings: Figure 1 is a partial vertical section of an embodiment of the invention as applied to the rabble arms of an ore roasting furnace. Fig. 2 is a section on line II—II of Fig. 1.

The hollow working member or arm 1 has the heat conductor lining 2. This lining 2 is maintained in position by the filling or packing 3, which may be the sand core. Abutting the inner end of the arm is the gasket 4, which may be a good heat conductor and serve to conduct the heat from the arm and its lining 2 to the cooling medium passing through the hollow shaft 5. The temperature controlled rotatable shaft 5 has the pipe 6 therein which may serve for the introduction of a liquid, as water. Surrounding the gasket 4 and the abutting flanges of the arm 1 and shaft 5, is the split ring 7 serving to protect the heat conductors.

What is claimed and it is desired to secure by Letters Patent is:

1. A shaft, means permitting circulation of a medium therein, a hollow arm, a heat conductor lining, and a gasket for the arm.

2. A shaft, a heat conductor lined arm, and a heat conductor gasket between the shaft and arm.

3. A hollow shaft having lateral openings, heat conductor lined arms, and heat conductor gaskets between the arms and shaft.

4. The combination with a self-supporting member subjected to high temperatures and strains and rendered flexible upon an excess of heat reaching it, of a heat conductor secured closely adjacent thereto to receive excess heat therefrom and transfer the heat away from said member to some point where the heat can be conveniently dissipated.

5. The combination with a self-supporting hollow member subjected to high temperatures and strains and rendered flexible upon an excess of heat reaching it, of a heat conductor secured within said member and adjacent the interior surface thereof, said heat conductor being extended out of said member to convey heat from said member to a point where it may be conveniently dissipated.

6. The combination with a hollow member adapted to be exposed to high temperatures, of a heat conductor disposed within said member adjacent the interior surface thereof and extended out of said member and adapted to convey heat from said member to a point where it may be conveniently dissipated, and means contained within said hollow member to retain said heat conductor in contact with the interior surface thereof.

7. The combination with a self-supporting hollow member subjected to high temperatures and strains and rendered flexible upon an excess of heat reaching it, of a heat conductor forming a lining secured within and fitting said member, said conductor being extended out of said member to convey heat from said member to a point where it may be conveniently dissipated.

8. The combination with a hollow shaft provided with an aperture, of a hollow arm having one end open secured to said shaft, with the open end of the arm registering with said aperture, a metal heat conducting lining contacting with the surface of the interior of said arm, and a metallic heat conducting gasket contacting with said heat conducting lining and preventing communication between the interior of said arm and said hollow shaft while presenting an exposed surface to a fluid which may be contained in said shaft.

9. The combination with a hollow shaft provided with an aperture, of a hollow arm having one end open secured to said shaft with the open end of the arm registering with said aperture, a metal heat conducting lining contacting with the surface of the interior of said arm, a metallic heat conducting gasket contacting with said heat conducting lining and preventing communication between the interior of said arm and said hollow shaft while presenting an exposed surface to a fluid which may be contained in said shaft, and a filling for said hollow arm.

In testimony whereof I affix my signature in presence of two witnesses.

WILLIAM A. RANKIN.

Witnesses:
 GEO. E. KIRK,
 G. F. DE WEIN.